United States Patent Office 2,723,204
Patented Nov. 8, 1955

2,723,204

DRY PLATING WITH METAL

Rolfe Pottberg and Erith T. Clayton, Baltimore, Md., assignors, by mesne assignments, to Peen Plate, Inc., Baltimore, Md., a corporation of Maryland No Drawing. Application April 19, 1950,
Serial No. 156,936

8 Claims. (Cl. 117—24)

This invention relates to the formation of metal coatings on the surface of metallic articles.

The object of the invention is to provide a process for building up a durable, adherent, compact and continuous surface coating layer consisting of incrementally deposited tiny particles.

Otherwise stated this invention provides a process by which the surface of metallic objects can be so clad, or plated, with another metal originally provided in finely comminuted or powder form; using purely mechanical and readily available means physically to integrate successive particles of cladding metal into a massively continuous and adherent surface structure.

In the practice of this invention small, hard, numerous impacting particles are used to provide a statistically random means of intercepting, impacting and incorporating through cohesion successive smaller particles of cladding metal; the number, frequency and randomness of such impacts cooperating to produce a uniformly distributed surface film of desired thickness.

Adhesion and cohesion are terms commonly used to describe the similar phenomena of, respectively, bonding between surfaces of unlike materials and bonding between surfaces of like materials. Adhesion generally involves the attachment of one solid surface to another through an intermediate material. The intermediate material is usually employed partly because it is in an initially plastic condition, and because of this is capable of conforming microscopically with the contours and microscopic irregularities of the surfaces to be joined. This results in the formation of two or three types of bond, such as inter-atomic bonds, adsorptive or secondary valence bonds, and mechanical bonds relying upon interlocking surface roughnesses at the interfaces if the plastic adhesive later hardens due to polymerization, cooling, evaporation of a liquid phase, etc. That this latter, purely mechanical, bond simply augments the other types is shown by the fact that even a very thin liquid capable of wetting and forming a film over two smooth, mating solid surfaces increases their tendency to stick together to an extent far greater than can be attributed to differential air pressures.

Cohesive bonds are generally noted when the solid surfaces to be joined have been specially prepared by polishing to permit them to come into close enough contact at a sufficient number of minute points and areas to approach the extent possible by using the previously referred to, dissimilar, plastic material capable of flowing into microscopic conformation with the irregularities of less-smooth surfaces. An example of this is the sticking together of highly finished gauge blocks, or of glass surfaces prepared for exact mating by grinding and polishing against each other.

Instead of previously preparing two solid surfaces so that they will conform microscopically, they may be pressed into sufficiently close conformation if the solids are capable of withstanding sufficient deformation without fracture, if sufficiently high unit pressures are employed and if intervening films of materials of zero plasticity do not interfere. In this instance one or more of the materials is made to function mechanically like the dissimilar, plastic adhesive; and the factor of mechanical interlocking is added to the other types of bond.

When an attempt is made to join compressively elastic materials like metals in this manner, it is found that the transmission of sufficiently high unit stresses down to the immediate vicinity of any given microscopic irregularity becomes very difficult, unless one or both have very thin sections or unless they are laterally physically constrained against flow, to prevent rupture by force components parallel to the surfaces.

These conditions are fulfilled in the manufacture of "green" powder metallurgy compacts, in which individual metal particles confined in a mold are distorted by pressure into juxtaposition with adjacent particles over a sufficient portion of their areas to form strong, self-supporting structures even before heating is employed to increase their plasticity and atomic mobility so that more bonds can be formed. The compressive elastic limit is exceeded in the vicinity of the points and areas of contact between particles, even though the total force is distributed over tremendous numbers of particles. Two other factors probably also play a part; the effect of atomic forces finally to complete by attraction the plastic flowing together of the surfaces at remaining gaps and, second, the increase in atomic energy freed by destruction of the crystal lattices on the surface.

It is evident from this illustration that, if one or both of the surfaces to be joined are initially very small in area, nominal forces will cause cold flow, distortion and cohesion.

If in addition to providing a very small contact area the material of the surface is very small in its third dimension normal to the surface, the entire mass of such a three-dimensionally small particle may be made to cohere firmly because the development of disruptive parallel force components will have no opportunity to occur before a very large attachment area to volume ratio is established.

Finally, if such a small particle is distorted with extreme rapidity its temperature may instantaneously be made to rise to a point at which many times as many bonds are formed than would result from a slow distortion.

The subject invention describes a means of utilizing these observations for the purpose of plating or cladding the surfaces of metallic objects with other metals; employing the metals to be applied in the form of extremely small particles, so that small forces and energies rapidly transmitted will cause their cohesion to and accumulation on the surfaces of the objects and on each other, the operation of the principles explored above permitting its accomplishment at surrounding temperatures far lower than would be necessary to cause attachment solely through the agency of heat.

When the metal to be applied to a metallic surface is provided in the form of a fine powder it is evidently impractical to provide formal, orderly mechanical means to place, distort and cohere each particle into a chosen position. It can be done, however, if conditions are set up such that, first, unattached particles are nearly always present immediately adjacent to all points on the surface to be plated and, second, a very large number of randomly distributed impacts is received by the surface; each concentrating its effect on a very small area in such a way that over a period of time each point of the surface will have had substantially equal treatment; the number of rapidly transmitted pressures received at each point being numerous enough to result in the statistical probability of equal coverage by metal powder particles frequently intervening between the impacting particles and the surface.

Such conditions are provided by a ball mill, or tumbling barrel containing, in dry admixture with a metal powder, a number of hard, dense objects; small enough to concentrate their effect over very small areas and to enable their use in very large numbers; and heavy enough to accumulate, during an average distance of drop, enough energy drastically to distort powder particles intervening between them and the surfaces of the objects to be plated. The conditions may also be obtained by projecting large numbers of such small, dense objects at the surface to be plated, in the presence of the metal powder.

Objects successfully used to deliver the impacts have been steel shot, cracked shot (grit), other small metallic particles such as the cuttings from nail-making machines (nail whiskers), silicon carbide granules and, when they are small enough, the objects to be plated themselves. Thus shot, brads, tacks and other small hardware may be plated without employing a separate impacting medium.

Transfer of films of multiple particle thickness is not obtained until the surface of the impacting particles has been covered with a film of the metal to be plated. Before this occurs the harder impacting objects tend to remove the tooth from the previously prepared objects, and plating under these circumstances is limited to thin "smeared" coatings.

The metal powders must be in finely comminuted form and present in sufficient quantity to provide a reservoir of material to be transferred to the surfaces. If little or no powder is present (and the impacting particles have a surface of the metal to be plated) the films accumulated will be limited in thickness to the amount of metal which can be retained by the microscopic irregularities of the surface, i. e., a "smear" of metal no more than one particle thick. This takes place in the complete absence of metal powder provided the impacting particles consist of or are surfaced with the metal, and is the basis of numerous patents.

The powders should be completely dry and, in the case of aluminum more than ¾ of one percent by weight of water added to the powder will limit the deposit to the smear type of coating. Similarly, aluminum powder stored without protection in a humid atmosphere where it can absorb and react with atmospheric moisture will become ineffective. It is probable that hydrated oxide films formed on the surface constitute the non-plastic intervening material sufficient to prevent bonding. The normal aluminum oxide monohydrate formed on exposure to air of any clean aluminum surface, and which must be presumed to be present on the powder particles, does not interfere with their bonding; possibly because of its extreme thinness. The addition of appreciable amounts of desiccants to control atmospherically introduced moisture only has the effect of substituting another, non-plastic substance which interferes with plating in the same way as the hydroxides otherwise formed. Similarly, the presence of greases and oils, particularly those containing long-chain, highly polar substances has a critical effect upon plating, due possibly to the inability of the metal atom bonds to span the distances represented by such long, surface adsorbed molecules. The objects to be plated should have a slightly etched surface such as is provided by acid attack, sand blasting or other abrasive treatment.

Summarizing, the conditions which produce only superficial coatings, referred to as smear coatings are: the surfaces to be plated have been inadequately prepared and etched; the impacting particles are not adequately surfaced with the metal to be applied; the metal powder particles are not clean, i. e., moisture, chlorides, sulfides, etc. have formed surface films; or metal powder is inadequate. Conditions resulting initially in such a smear coating never result in thick, multiple particle films no matter how long processing is continued. Other factors producing unsatisfactory results are too high a proportion of large objects to impacting objects; insufficient impact due to improper mill action, too small a mill or insufficiently heavy impacting objects; and too great a powder supply, which results in a condition of loose and excessively rapid agglomeration.

In many cases it is desirable to conduct the operation in a non-oxidizing atmosphere such as that of an appropriate gas or a vacuum. Both have the advantage of eliminating atmospherically introduced moisture and, in the case of zinc, produce brighter coatings. The use of vacuum has the advantage of increasing the rate of fall of impacting objects and of decreasing the rate of heat conduction away from the metal powder particles being more rapidly distorted and heated.

Very moderate increases in the temperature at which the operation is conducted have a striking effect, the increase in plasticity and atomic mobility resulting in the permanent embedment of a much larger percentage of the particles. In the case of aluminum operation at 150° C. results in four times the rate of accumulation as at 25° C. In industrial scale apparatus temperatures of this order are achievable by insulating the mills in which the operation is being performed.

Because of the low costs with which substantial coatings can be given to large batches of objects adapted to be tumbled, the process offers a means of more cheaply sherardizing and calorizing, since special protective atmospheres and fluxes may be dispensed with, the application of zinc or aluminum, respectively, being accomplished at or only slightly above room temperature and subsequently heated, the deposited metal protecting the base metal against oxidation. In the case of objects to be calorized as a protection against high temperature oxidation the subsequent heating can be accomplished by the conditions of service themselves.

In addition to aluminum and zinc, the process has been used to apply cadmium, tin and lead to iron and steel surfaces, as well to other metals. Aluminum can be applied to magnesium and to alloys of aluminum and magnesium. Alloys of aluminum with copper have been applied using metal powders of the alloy. Many of the possible combinations are not commercially practicable by other, existing means.

The following will constitute examples of the practical working of the subject process.

1. Ten pounds of ten mesh cracked shot (grit), already well coated with zinc were charged to a small mill seven inches in diameter by eight inches long, together with three-fourths pounds of clean, dry, zinc dust, the particle size of which varied between three and fifty microns. Three pounds of six-penny nails, previously treated in a dilute mineral acid solution and thereafter dried, were then added and the mill closed. The mill was rotating at fifty-seven revolutions per minutes for three hours at room temperature. The zinc coating which resulted was continuous and uniform, and averaged .001 inch in thickness.

2. In an otherwise identical test to No. 1 above, a small piece of solid carbon dioxide was added to the mill before closing, resulting in the displacement of air by the carbon dioxide gas. The product from this mill was identical to the product of test No. 1 above, except that it was considerably brighter in appearance.

3. A test identical to No. 1, except that the impacting particles had previously been coated with aluminum and that two hundred grams of clean, dry aluminum powder, averaging less than minus two hundred mesh in average particle size, was substituted for the zinc powder. Operation under identical conditions for five hours resulted in a substantial, uniform film of aluminum .001 inch in thickness.

4. A test identical to No. 3, except that it was conducted at 100° C. and operated for only three hours. The coating from this run was .002 inch in thickness.

5. A test identical to No. 4, above, except that it was operated at 150° C. The coating from this run was .004 inch in thickness.

As an illustration of the operation of the process on a larger scale; 300 pounds of ten mesh grit, previously coated with aluminum, were charged to a mill eighteen inches in diameter by twenty-six inches long, together with seven pounds of aluminum powder with the previously described characteristics, and fifty pounds of steel washers—one inch in outside diameter. The mill was operated at thirty-seven revolutions per minute for five hours, and it produced a coating of aluminum .001 inch in thickness on the surface of the washers.

Temperatures substantially above room temperature were achievable by insulating this mill to combine the frictional heating evolved therein, with corresponding increases in coating thickness.

As an example of the operation of this process on a still larger scale; 2000 pounds of ten mesh grit were charged to a mill thirty-six inches in diameter and forty-five inches long, together with 150 pounds of zinc powder of the previously described characteristics, and 300 pounds of roofing nails one inch long, which had previously had their surfaces etched by tumbling with "mill scale" (magnetic iron oxide). This mill was operated for eight hours to produce a zinc coating of .0015 inch in thickness, during which time the temperature rose to 127° F., although the mill was not insulated.

The process has been used to apply aluminum, cadmium, zinc, lead, tin and various alloys of these with each other and with other metals. Alloys may be plated by using powders prepared from previously alloyed metals, as, for example, with aluminum alloyed with copper.

Composite coatings may be applied as, for example, a coating of zinc with a superimposed coating of aluminum. If previously alloyed powders are not obtainable, an alloyed surface film consisting of one or more superimposed metals with the metal of the base can be obtained by subsequently heating objects coated with such metals, and obtaining characteristics often not obtainable otherwise. When the coatings built up by this method are not thick enough to assure complete freedom from porosity, diffusion of the surface metal or metals into the metal of the base will, of course, produce uniform characteristics over the entire surface.

While the coatings produced by this process generally have a "satin" or matte surface, they may be made bright by a final burnishing treatment in the same apparatus in which they were produced, by increase of speed to produce tangential relative movements and also by addition of, or substitution for, the impacting medium of materials commonly used for burnishing treatment in tumbling barrels.

When a coating of aluminum, for example, has been produced at low temperatures, the coating will be severely cold worked, and this evidences itself, in thick coatings, in a lack of ductility upon bending of an object so plated. This effect can be overcome by a subsequent heat treatment of a few seconds duration at 500–600° C. without causing signfiicant diffusion with the base metal.

We claim:

1. The method of cladding the surfaces of a plurality of small, dense, hard objects with a metal coating comprising mixing said objects in direct contact with a minor proportion of finely comminuted malleable plastic metal powder particles smaller than said hard objects and less than one-hundredth of an inch in their major dimensions and sufficient in amount to provide the desired thickness of coating, said mixture being completely dry and said powder particles being softer than the surfaces of the objects, subjecting the mixture to treatment in a dry gaseous medium selected from the group consisting of air, a non-oxidizing atmosphere and a vacuum and maintained completely dry, and bringing the objects together into collision with the particles intervening between them as they come together with consequent impact under forces concentrating their effect over very small areas and suddenly and drastically distorting said particles to flattened form between said objects and into extended contact with the surfaces thereof and attaching the flattened particles in toto to the said surfaces, continuing the said treatment of the mixture in said dry gaseous medium to confirm and augment the flattening of said particles and their attachment to said surfaces to form a continuous superposed coating of the softer flattened metal particles on the surfaces of said objects, and continuing said treatment in said dry gaseous medium similarly to flatten and attach other particles to the said surface layer and build up thereon superposed layers of additional similarly flattened metal particles to desired depth of coating.

2. The method of cladding objects with relatively soft metal particles as set forth in claim 1 in which the completely dry mixture is kept dry by maintaining the operation continuously enclosed against the entrance of air.

3. The method of cladding objects with relatively soft metal particles as set forth in claim 1 in which the completely dry mixture includes a multiplicity of small dense impacting objects substantially larger than the particles of metal powder and having films of the powder particles.

4. The method of cladding objects with relatively soft metal particles as set forth in claim 1 in which the operation is carried on in a non-oxidizing atmosphere.

5. The method of cladding objects with relatively soft metal particles as set forth in claim 1 in which the dry gaseous medium is reduced to a vacuum.

6. The method of cladding objects with relatively soft metal particles as set forth in claim 1 in which the objects have etched surfaces.

7. The method of cladding objects with relatively soft metal particles as set forth in claim 1 in which the temperature of the operation is above room temperature and below the melting temperature of the metal particles.

8. The method of cladding objects with relatively soft metal particles as set forth in claim 1 in which the objects are of metal and after cladding are heated to a high temperature to cause substantial diffusion of the metal of the coating with the metal of the objects.

References Cited in the file of this patent

UNITED STATES PATENTS

| | | |
|---|---|---|
| 745,224 | Morton | Nov. 24, 1903 |
| 2,075,518 | Gettleman | Mar. 30, 1937 |
| 2,345,941 | Lehman | Apr. 4, 1944 |
| 2,378,588 | Skehan et al. | June 19, 1945 |
| 2,381,413 | Wolff | Aug. 7, 1945 |
| 2,423,880 | De Graaf | July 15, 1947 |